United States Patent
Jiang et al.

(10) Patent No.: US 8,248,381 B2
(45) Date of Patent: *Aug. 21, 2012

(54) TOUCH PANEL AND DISPLAY DEVICE USING THE SAME

(75) Inventors: Kai-Li Jiang, Beijing (CN); Liang Liu, Beijing (CN); Shou-Shan Fan, Beijing (CN)

(73) Assignees: Tsinghua University, Beijing (CH); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 595 days.

This patent is subject to a terminal disclaimer.

(21) Appl. No.: 12/286,189

(22) Filed: Sep. 29, 2008

(65) Prior Publication Data

US 2009/0153511 A1 Jun. 18, 2009

(30) Foreign Application Priority Data

Dec. 12, 2007 (CN) .......................... 2007 1 0125104

(51) Int. Cl.
G06F 3/041 (2006.01)

(52) U.S. Cl. ........................................ 345/173; 313/582

(58) Field of Classification Search .................. 345/173; 524/496; 257/222; 349/12; 313/336; 428/339
See application file for complete search history.

(56) References Cited

U.S. PATENT DOCUMENTS

| | | |
|---|---|---|
| 4,659,873 A | 4/1987 | Gibson et al. |
| 4,922,061 A | 5/1990 | Meadows et al. |
| 4,933,660 A | 6/1990 | Wynne, Jr. |
| 5,181,030 A | 1/1993 | Itaya et al. |
| 5,853,877 A | 12/1998 | Shibuta |
| 5,861,583 A | 1/1999 | Schediwy et al. |
| 6,373,472 B1 | 4/2002 | Palalau et al. |
| 6,423,583 B1 | 7/2002 | Avouris et al. |
| 6,628,269 B2 | 9/2003 | Shimizu |
| 6,629,833 B1 * | 10/2003 | Ohya et al. ................ 425/458 |
| 6,914,640 B2 | 7/2005 | Yu |
| 6,947,203 B2 | 9/2005 | Kanbe |
| 7,054,064 B2 | 5/2006 | Jiang et al. |
| 7,060,241 B2 | 6/2006 | Glatkowski |
| 7,071,927 B2 | 7/2006 | Blanchard |
| 7,084,933 B2 | 8/2006 | Oh et al. |
| 7,196,463 B2 | 3/2007 | Okai et al. |

(Continued)

FOREIGN PATENT DOCUMENTS

CN 2539375 3/2003

(Continued)

OTHER PUBLICATIONS

Ri Kurosawa, "Technology Trends of Capacitive Touch Panel", Technology and Development of Touch Panel, Amc, First Impression, pp. 54-64, Dec. 27, 2004.

(Continued)

*Primary Examiner* — Nimeshkumar Patel
*Assistant Examiner* — Mary Ellen Bowman
(74) *Attorney, Agent, or Firm* — Altis Law Group, Inc.

(57) ABSTRACT

A touch panel includes a substrate, a transparent conductive layer, and at least two electrodes. The transparent conductive layer is disposed on the substrate. The at least two electrodes is separately disposed, and electrically connected with the transparent conductive layer. At least one of the electrodes includes a carbon nanotube layer. Further a display device using the above-described touch panel is also included.

18 Claims, 5 Drawing Sheets

U.S. PATENT DOCUMENTS

| | | | |
|---|---|---|---|
| 7,215,329 B2 | 5/2007 | Yoshikawa et al. | |
| 7,242,136 B2 | 7/2007 | Kim et al. | |
| 7,336,261 B2 | 2/2008 | Yu | |
| 7,348,966 B2 | 3/2008 | Hong et al. | |
| 7,355,592 B2 | 4/2008 | Hong et al. | |
| 7,532,182 B2 | 5/2009 | Tseng et al. | |
| 7,593,004 B2 | 9/2009 | Spath et al. | |
| 7,630,040 B2 | 12/2009 | Liu et al. | |
| 7,662,732 B2 | 2/2010 | Choi et al. | |
| 7,663,607 B2 | 2/2010 | Hotelling et al. | |
| 7,704,480 B2 | 4/2010 | Jiang et al. | |
| 7,710,649 B2 | 5/2010 | Feng et al. | |
| 7,796,123 B1 | 9/2010 | Irvin, Jr. et al. | |
| 7,825,911 B2 | 11/2010 | Sano et al. | |
| 7,854,992 B2 | 12/2010 | Fu et al. | |
| 7,947,977 B2 | 5/2011 | Jiang et al. | |
| 2002/0089492 A1 | 7/2002 | Ahn et al. | |
| 2003/0122800 A1* | 7/2003 | Yu | 345/173 |
| 2003/0147041 A1 | 8/2003 | Oh et al. | |
| 2003/0189235 A1 | 10/2003 | Watanabe et al. | |
| 2004/0047038 A1 | 3/2004 | Jiang et al. | |
| 2004/0053780 A1 | 3/2004 | Jiang et al. | |
| 2004/0099438 A1 | 5/2004 | Arthur et al. | |
| 2004/0105040 A1 | 6/2004 | Oh et al. | |
| 2004/0136896 A1 | 7/2004 | Liu et al. | |
| 2004/0191157 A1 | 9/2004 | Harutyunyan et al. | |
| 2004/0251504 A1 | 12/2004 | Noda | |
| 2005/0110720 A1 | 5/2005 | Akimoto et al. | |
| 2005/0151195 A1 | 7/2005 | Kavase et al. | |
| 2005/0209392 A1* | 9/2005 | Luo et al. | 524/496 |
| 2006/0010996 A1 | 1/2006 | Jordan et al. | |
| 2006/0022221 A1* | 2/2006 | Furukawa et al. | 257/222 |
| 2006/0044284 A1 | 3/2006 | Tanabe | |
| 2006/0077147 A1 | 4/2006 | Palmateer et al. | |
| 2006/0097991 A1 | 5/2006 | Hotelling et al. | |
| 2006/0171032 A1 | 8/2006 | Nishioka | |
| 2006/0187213 A1 | 8/2006 | Su | |
| 2006/0187369 A1 | 8/2006 | Chang | |
| 2006/0188721 A1 | 8/2006 | Irvin, Jr. et al. | |
| 2006/0213251 A1 | 9/2006 | Rinzler et al. | |
| 2006/0240605 A1 | 10/2006 | Moon et al. | |
| 2006/0262055 A1 | 11/2006 | Takahara | |
| 2006/0263588 A1 | 11/2006 | Handa et al. | |
| 2006/0274047 A1 | 12/2006 | Spath et al. | |
| 2006/0274048 A1* | 12/2006 | Spath et al. | 345/173 |
| 2006/0274049 A1 | 12/2006 | Spath et al. | |
| 2006/0275956 A1* | 12/2006 | Konesky | 438/128 |
| 2006/0278444 A1 | 12/2006 | Binstead | |
| 2007/0065651 A1 | 3/2007 | Glatkowski et al. | |
| 2007/0075619 A1 | 4/2007 | Jiang et al. | |
| 2007/0081681 A1 | 4/2007 | Yu et al. | |
| 2007/0099333 A1 | 5/2007 | Moriya | |
| 2007/0165004 A1 | 7/2007 | Seelhammer et al. | |
| 2007/0182720 A1 | 8/2007 | Fujii et al. | |
| 2007/0215841 A1 | 9/2007 | Ford et al. | |
| 2007/0257894 A1 | 11/2007 | Philipp | |
| 2007/0262687 A1 | 11/2007 | Li | |
| 2007/0279556 A1 | 12/2007 | Wang et al. | |
| 2007/0296897 A1 | 12/2007 | Liu et al. | |
| 2007/0298253 A1 | 12/2007 | Hata et al. | |
| 2008/0007535 A1 | 1/2008 | Li | |
| 2008/0029292 A1 | 2/2008 | Takayama et al. | |
| 2008/0048996 A1 | 2/2008 | Hu et al. | |
| 2008/0088219 A1 | 4/2008 | Yoon et al. | |
| 2008/0095694 A1 | 4/2008 | Nakayama et al. | |
| 2008/0129666 A1 | 6/2008 | Shimotono et al. | |
| 2008/0138589 A1 | 6/2008 | Wakabayashi et al. | |
| 2008/0192014 A1* | 8/2008 | Kent et al. | 345/173 |
| 2008/0238882 A1 | 10/2008 | Sivarajan et al. | |
| 2008/0266273 A1 | 10/2008 | Slobodin et al. | |
| 2009/0032777 A1 | 2/2009 | Kitano et al. | |
| 2009/0056854 A1 | 3/2009 | Oh et al. | |
| 2009/0059151 A1 | 3/2009 | Kim et al. | |
| 2009/0101488 A1 | 4/2009 | Jiang et al. | |
| 2009/0153511 A1 | 6/2009 | Jiang et al. | |
| 2009/0153513 A1 | 6/2009 | Liu et al. | |
| 2009/0153516 A1 | 6/2009 | Liu et al. | |
| 2009/0167709 A1 | 7/2009 | Jiang et al. | |
| 2009/0208708 A1 | 8/2009 | Wei et al. | |
| 2009/0283211 A1 | 11/2009 | Matsuhira | |
| 2009/0293631 A1 | 12/2009 | Radivojevic | |
| 2010/0001972 A1 | 1/2010 | Jiang et al. | |
| 2010/0001975 A1 | 1/2010 | Jiang et al. | |
| 2010/0001976 A1 | 1/2010 | Jiang et al. | |
| 2010/0007619 A1 | 1/2010 | Jiang et al. | |
| 2010/0007624 A1 | 1/2010 | Jiang et al. | |
| 2010/0007625 A1 | 1/2010 | Jiang et al. | |
| 2010/0065788 A1 | 3/2010 | Momose et al. | |
| 2010/0078067 A1 | 4/2010 | Jia et al. | |
| 2010/0093247 A1 | 4/2010 | Jiang et al. | |
| 2010/0171099 A1 | 7/2010 | Tombler, Jr. et al. | |
| 2010/0271330 A1 | 10/2010 | Philipp | |
| 2011/0032196 A1 | 2/2011 | Feng et al. | |

FOREIGN PATENT DOCUMENTS

| | | |
|---|---|---|
| CN | 1447279 | 10/2003 |
| CN | 1447279 A | 10/2003 |
| CN | 1482472 | 3/2004 |
| CN | 1483667 | 3/2004 |
| CN | 1484865 | 3/2004 |
| CN | 1501317 | 6/2004 |
| CN | 1503195 | 6/2004 |
| CN | 1509982 | 7/2004 |
| CN | 1519196 | 8/2004 |
| CN | 2638143 | 9/2004 |
| CN | 1543399 | 11/2004 |
| CN | 1543399 A | 11/2004 |
| CN | 1671481 | 9/2005 |
| CN | 1675580 | 9/2005 |
| CN | 1690915 A | 11/2005 |
| CN | 1738018 | 2/2006 |
| CN | 1744021 A | 3/2006 |
| CN | 1745302 | 3/2006 |
| CN | 1803594 | 7/2006 |
| CN | 1823320 | 8/2006 |
| CN | 1292292 C | 12/2006 |
| CN | 2844974 Y | 12/2006 |
| CN | 1903793 | 1/2007 |
| CN | 1942853 | 4/2007 |
| CN | 1947203 | 4/2007 |
| CN | 1948144 | 4/2007 |
| CN | 1315362 | 5/2007 |
| CN | 1982209 | 6/2007 |
| CN | 1996620 | 7/2007 |
| CN | 1998067 | 7/2007 |
| CN | 101017417 | 8/2007 |
| CN | 101059738 | 10/2007 |
| CN | 101165883 | 4/2008 |
| DE | 202007006407 | 9/2007 |
| EP | 1739692 | 1/2007 |
| JP | S61-231626 | 10/1986 |
| JP | S62-63332 | 3/1987 |
| JP | 62-139028 | 6/1987 |
| JP | S62-182916 | 8/1987 |
| JP | S62-190524 | 8/1987 |
| JP | H2-8926 | 1/1990 |
| JP | 1991-54624 | 3/1991 |
| JP | H3-54624 | 3/1991 |
| JP | 5-53715 | 3/1993 |
| JP | H06-28090 | 2/1994 |
| JP | H6-67788 | 3/1994 |
| JP | 8-287775 | 11/1996 |
| JP | H10-63404 | 3/1998 |
| JP | 2001-34419 | 2/2001 |
| JP | 2001-267782 | 9/2001 |
| JP | 2002-278701 | 9/2002 |
| JP | 2003-99192 | 4/2003 |
| JP | 2003-99193 | 4/2003 |
| JP | 2003-288164 | 10/2003 |
| JP | 2003303978 | 10/2003 |
| JP | 2004-26532 | 1/2004 |
| JP | 2004-102217 | 4/2004 |
| JP | 2004-189573 | 7/2004 |
| JP | 2004-253796 | 9/2004 |
| JP | 2004-266272 | 9/2004 |
| JP | 2005-67976 | 3/2005 |
| JP | 2005-85485 | 3/2005 |

| | | |
|---|---|---|
| JP | 2005-176428 | 6/2005 |
| JP | 2005-182339 | 7/2005 |
| JP | 2005-222182 | 8/2005 |
| JP | 2005-286158 | 10/2005 |
| JP | 2006-171336 | 6/2006 |
| JP | 2006-228818 | 8/2006 |
| JP | 2006-243455 | 9/2006 |
| JP | 2006-521998 | 9/2006 |
| JP | 2006-269311 | 10/2006 |
| JP | 2006-285068 | 10/2006 |
| JP | 2007-11997 | 1/2007 |
| JP | 2007-31238 | 2/2007 |
| JP | 2007-73706 | 3/2007 |
| JP | 2007-112133 | 5/2007 |
| JP | 2007-123870 | 5/2007 |
| JP | 2007-161563 | 6/2007 |
| JP | 2007-161576 | 6/2007 |
| JP | 2007-182357 | 7/2007 |
| JP | 2007-182546 | 7/2007 |
| JP | 2007-229989 | 9/2007 |
| JP | 2007-299409 | 11/2007 |
| JP | 2007-310869 | 11/2007 |
| JP | 2008-102968 | 5/2008 |
| JP | 2008-139711 | 6/2008 |
| JP | 2008-536710 | 9/2008 |
| JP | 2008-542953 | 11/2008 |
| JP | 2009-104577 | 5/2009 |
| KR | 0525731 | 11/2005 |
| KR | 20060129977 | 12/2006 |
| KR | 20070012414 | 1/2007 |
| KR | 20070081902 | 8/2007 |
| KR | 2007-0108077 | 11/2007 |
| TW | 131955 | 4/1990 |
| TW | 341684 | 10/1998 |
| TW | 498266 | 8/2002 |
| TW | 508652 | 11/2002 |
| TW | 521227 | 2/2003 |
| TW | 200403498 | 3/2004 |
| TW | 242732 | 9/2004 |
| TW | 200518195 | 6/2005 |
| TW | I233570 | 6/2005 |
| TW | I234676 | 6/2005 |
| TW | 200522366 | 7/2005 |
| TW | 284963 | 1/2006 |
| TW | I249134 | 2/2006 |
| TW | I249708 | 2/2006 |
| TW | I251710 | 3/2006 |
| TW | I253846 | 4/2006 |
| TW | 200622432 | 7/2006 |
| TW | I258708 | 7/2006 |
| TW | I261716 | 9/2006 |
| TW | I267014 | 11/2006 |
| TW | M306694 | 2/2007 |
| TW | 200710493 | 3/2007 |
| TW | 200713337 | 4/2007 |
| TW | 200717083 | 5/2007 |
| TW | 200719198 | 5/2007 |
| TW | D117141 | 5/2007 |
| TW | 200722559 | 6/2007 |
| TW | 200727163 | 7/2007 |
| TW | 284927 | 8/2007 |
| TW | 200729241 | 8/2007 |
| TW | 200736979 | 10/2007 |
| TW | 200737414 | 10/2007 |
| TW | 200738558 | 10/2007 |
| TW | 200928914 | 7/2009 |
| TW | 200929638 | 7/2009 |
| TW | 200929643 | 7/2009 |
| TW | 201005612 | 7/2009 |
| WO | WO02076724 | 10/2002 |
| WO | WO02076724 A1 | 10/2002 |
| WO | WO2004019119 | 3/2004 |
| WO | WO2004052559 | 6/2004 |
| WO | WO2004114105 | 12/2004 |
| WO | WO2005102924 | 11/2005 |
| WO | WO2005104141 | 11/2005 |
| WO | WO2006003245 | 1/2006 |
| WO | WO2006014241 | 2/2006 |
| WO | WO2006030981 | 3/2006 |
| WO | WO2006031981 | 3/2006 |
| WO | WO2006120803 | 11/2006 |
| WO | WO2006126604 | 11/2006 |
| WO | WO2006130366 | 12/2006 |
| WO | WO2007008518 | 1/2007 |
| WO | 2007012899 | 2/2007 |
| WO | 2007022226 | 2/2007 |
| WO | WO2007063751 | 6/2007 |
| WO | WO2007066649 | 6/2007 |
| WO | WO2007099975 | 9/2007 |
| WO | WO2008013517 | 1/2008 |

OTHER PUBLICATIONS

Mei Zhang etal., "Strong Transparent, Multifunctional, Carbon Nanotube Sheets", Science, America, AAAS, vol. 309, pp. 1215-1219, Aug. 19, 2005.
Yoshikazu Nakayama, "Technology Development of CNT Long Yarns and CNT Sheets", Nano Carbon Handbook, Japan TSN Inc, pp. 261-266, Jul. 17, 2007.
George Gruner, "Carbon Nanonets Spark New Electronics", Scientific American, pp. 76-83, May 2007.
Yagasaki Takuya, Nakanishi Rou, "Resistance Film Type Touch Panel", Technologies and Developments of Touch Panels, Amc, First Impression, pp. 80-93, Dec. 27, 2004.
Kai-Li Jiang, Qun-Qing Li, Shou-Shan Fan, "Continuous carbon nanotube yarns and their applications", Physics, China, pp. 506-510,Aug. 31, 2003,32(8).
Yu Xiang, Technique of Touch Panel & the Production of Resistance-type Touch Panel Insulation Dot, Journal of Longyan Teachers College, p. 25-26, vol. 22, No. 6, 2004.
Fan et al. "Self-Oriented Regular Arrays of Carbon Nanotubes and Their Field Emission Properties". Science, vol. 283, (1999); pp. 512-514.
ASM Handbook. "vol. 2 Properties and Selection: Nonferrous Alloys and Special-Purpose Materials".Apr. 2007; pp. 840-853.
Susuki et al. "Investigation of physical and electric properties of silver pastes as binder for thermoelectric materials". Review of Scientific Instruments,76,(2005);pp. 023907-1 to 023907-5.
Wu et al. "Transparent, Conductive Carbon Nanotube Films". Science,vol. 305,(2004);pp. 1273-1276.
R Colin Johnson, "Carbon nanotubes aim for cheap, durable touch screens",Aug. 2007 http://psroc.phys.ntu.edu.tw/bimonth/v27/615.pdf.
Xianglin Liu, "strong, transparent, multifunctional carbon nanotube sheets", pp. 720-721, Oct. 2005 http://www.eettaiwan.com/articleLogin.do?artId=8800474428&fromWhere=/ART_8800474428_480502_NT_95e7014f.HTM&catId=480502&newsType=NT&pageNo=null&encode=95e7014f.

* cited by examiner

TOUCH PANEL AND DISPLAY DEVICE USING THE SAME

RELATED APPLICATIONS

This application is related to commonly-assigned applications entitled, "TOUCH PANEL", Ser. No. 12/286,266 filed Sep. 29, 2008 "TOUCH PANEL", Ser. No. 12/286,141, filed Sep. 29, 2008; "TOUCH PANEL AND DISPLAY DEVICE USING THE SAME", Ser. No. 12/286,154, filed Sep. 29, 2008; "TOUCH PANEL AND DISPLAY DEVICE USING THE SAME", Ser. No. 12/286,181; filed Sep. 29, 2008; "TOUCH PANEL AND DISPLAY DEVICE USING THE SAME", Ser. No. 12/286,176 filed Sep. 29, 2008; "ELECTRONIC ELEMENT HAVING CARBON NANOTUBES", Ser. No. 12/286,143 filed Sep. 29, 2008; "TOUCH PANEL AND DISPLAY DEVICE USING THE SAME", Ser. No. 12/286,166 filed Sep. 29, 2008; "TOUCH PANEL AND DISPLAY DEVICE USING THE SAME", Ser. No. 12/286,178 filed Sep. 29, 2008; "TOUCH PANEL AND DISPLAY DEVICE USING THE SAME", Ser. No. 12/286,148 filed Sep. 29, 2008; "TOUCHABLE CONTROL DEVICE", Ser. No. 12/286,140 filed Sep. 29, 2008; "TOUCH PANEL AND DISPLAY DEVICE USING THE SAME", Ser. No. 12/286, 146 filed Sep. 29, 2008; "TOUCH PANEL AND DISPLAY DEVICE USING THE SAME", Ser. No. 12/286,216 filed Sep. 29, 2008; "TOUCH PANEL AND DISPLAY DEVICE USING THE SAME", Ser. No. 12/286,152 filed Sep. 29, 2008; "TOUCH PANEL AND DISPLAY DEVICE USING THE SAME", Ser. No. 12/286,145 filed Sep. 29, 2008; "TOUCH PANEL, METHOD FOR MAKING THE SAME, AND DISPLAY DEVICE ADOPTING THE SAME", Ser. No. 12/286,155 filed Sep. 29, 2008; "TOUCH PANEL AND DISPLAY DEVICE USING THE SAME", Ser. No. 12/286, 179 filed Sep. 29, 2008; "TOUCH PANEL, METHOD FOR MAKING THE SAME, AND DISPLAY DEVICE ADOPTING THE SAME", Ser. No. 12/286,228 filed Sep. 29, 2008; "TOUCH PANEL AND DISPLAY DEVICE USING THE SAME", Ser. No. 12/286,153 filed Sep. 29, 2008; "TOUCH PANEL AND DISPLAY DEVICE USING THE SAME", Ser. No. 12/286,184 filed Sep. 29, 2008; "METHOD FOR MAKING TOUCH PANEL", Ser. No. 12/286,175 filed Sep. 29, 2008; "METHOD FOR MAKING TOUCH PANEL", Ser. No. 12/286,195 filed Sep. 29, 2008; "TOUCH PANEL AND DISPLAY DEVICE USING THE SAME", Ser. No. 12/286,160 filed Sep. 29, 2008; "TOUCH PANEL AND DISPLAY DEVICE USING THE SAME", Ser. No. 12/286,220 filed Sep. 29, 2008; "TOUCH PANEL AND DISPLAY DEVICE USING THE SAME", Ser. No. 12/286,227 filed Sep. 29, 2008;"TOUCH PANEL AND DISPLAY DEVICE USING THE SAME", Ser. No. 12/286,144 filed Sep. 29, 2008; "TOUCH PANEL AND DISPLAY DEVICE USING THE SAME", Ser. No. 12/286,218 filed Sep. 29, 2008; "TOUCH PANEL AND DISPLAY DEVICE USING THE SAME", Ser. No. 12/286,142 filed Sep. 29, 2008; "TOUCH PANEL AND DISPLAY DEVICE USING THE SAME", Ser. No. 12/286,241 filed Sep. 29, 2008; "TOUCH PANEL, METHOD FOR MAKING THE SAME, AND DISPLAY DEVICE ADOPTING THE SAME", Ser. No. 12/286,151 filed Sep. 29, 2008; and "TOUCH PANEL, METHOD FOR MAKING THE SAME, AND DISPLAY DEVICE ADOPTING THE SAME", Ser. No. 12/286,219 filed Sep. 29, 2008. The disclosures of the above-identified applications are incorporated herein by reference.

BACKGROUND

1. Field of the Invention

The present invention relates to touch panels and display devices using the same and, particularly, to a carbon nanotube based touch panel and a display device using the same.

2. Discussion of Related Art

Following the advancement in recent years of various electronic apparatuses, such as mobile phones, car navigation systems and the like, toward high performance and diversification, there has been continuous growth in the number of electronic apparatuses equipped with optically transparent touch panels in front of their respective display devices (e.g., liquid crystal panels). A user of any such electronic apparatus operates it by pressing or touching a touch panel with a finger, a pen, stylus, or another like tool while visually observing the display device through the touch panel. A demand thus exists for such touch panels that are superior in visibility and reliable in operation.

At present, different types of touch panels, including a resistance-type, a capacitance-type, an infrared-type, and a surface sound wave-type have been developed. The capacitance-type touch panel has the following advantages, such as high accuracy and strong anti-jamming ability, thus have been widely used.

A conventional capacitance-type touch panel includes a glass substrate, a transparent conductive layer, and four electrodes. The material of the transparent conductive layer is selected from a group consisting of indium tin oxide (ITO) and antimony tin oxide (ATO). The electrodes are made of metal and separately formed on a surface of the transparent conductive layer. Further, a protective layer is formed on the surface of the transparent conductive layer facing away from the substrate. The material of the protective layer is liquid glass.

In operation, an upper surface of the touch panel is pressed/touched with a touch tool, such as a finger, or an electrical pen. And visual observation of a screen on the liquid crystal display device provided on a back side of the touch panel is allowed. In use, due to an electrical field of the user, a coupling capacitance forms between the user and the transparent conductive layer. For high frequency electrical current, the coupled capacitance is a conductor, thus the touch tool takes away a little current from the touch point. Current flowing through the four electrodes cooperatively replace the current lost at the touch point. The quantity of current supplied by the four electrodes is directly proportional to the distances from the touch point to the electrodes. A touch panel controller is used to calculate the proportion of the four supplied currents, thereby detecting coordinates of the touch point on the touch panel.

However, the material of the electrodes such as metal has poor wearability/durability and low chemical endurance. Further, when the substrate is deformable and made of soft material, the electrodes formed on the substrate is easily to be destroyed and break off during operation. The above-mentioned problems of the metallic electrodes make for a touch panel with low sensitivity, accuracy and durability. Additionally, the cost for forming the metallic electrodes is relatively high.

What is needed, therefore, is to provide a durable touch panel with high sensitivity, accuracy, and brightness, and a display device using the same.

SUMMARY OF THE INVENTION

A touch panel includes a substrate, a transparent conductive layer, and at least two electrodes. The transparent conductive layer is disposed on the substrate. The at least two electrodes are separately disposed, and electrically connected with the transparent conductive layer. At least one of the electrodes includes a carbon nanotube layer.

Other advantages and novel features of the present touch panel and display device using the same will become more apparent from the following detailed description of preferred embodiments when taken in conjunction with the accompanying drawings.

BRIEF DESCRIPTION OF THE DRAWINGS

Many aspects of the present touch panel and display device using the same can be better understood with reference to the following drawings. The components in the drawings are not necessarily to scale, the emphasis instead being placed upon clearly illustrating the principles of the present touch panel and display device using the same.

Figure 1:
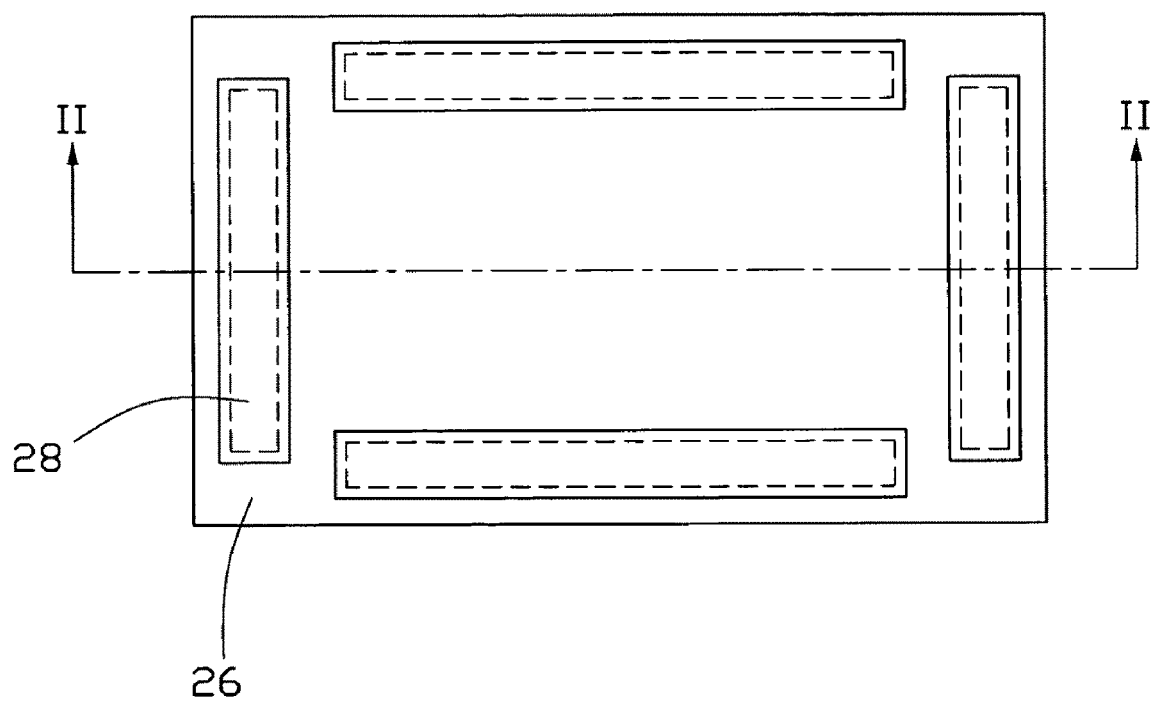
FIG. 1 is a schematic view of a partially assembled touch panel, in accordance with a present embodiment.

Corresponding reference characters indicate corresponding parts throughout the several views. The exemplifications set out herein illustrate at least one embodiment of the present touch panel and display device using the same, in at least one form, and such exemplifications are not to be construed as limiting the scope of the invention in any manner.

DETAILED DESCRIPTION OF PREFERRED EMBODIMENTS

Reference will now be made to the drawings to describe, in detail, embodiments of the present touch panel and display device using the same.

Figure 2:
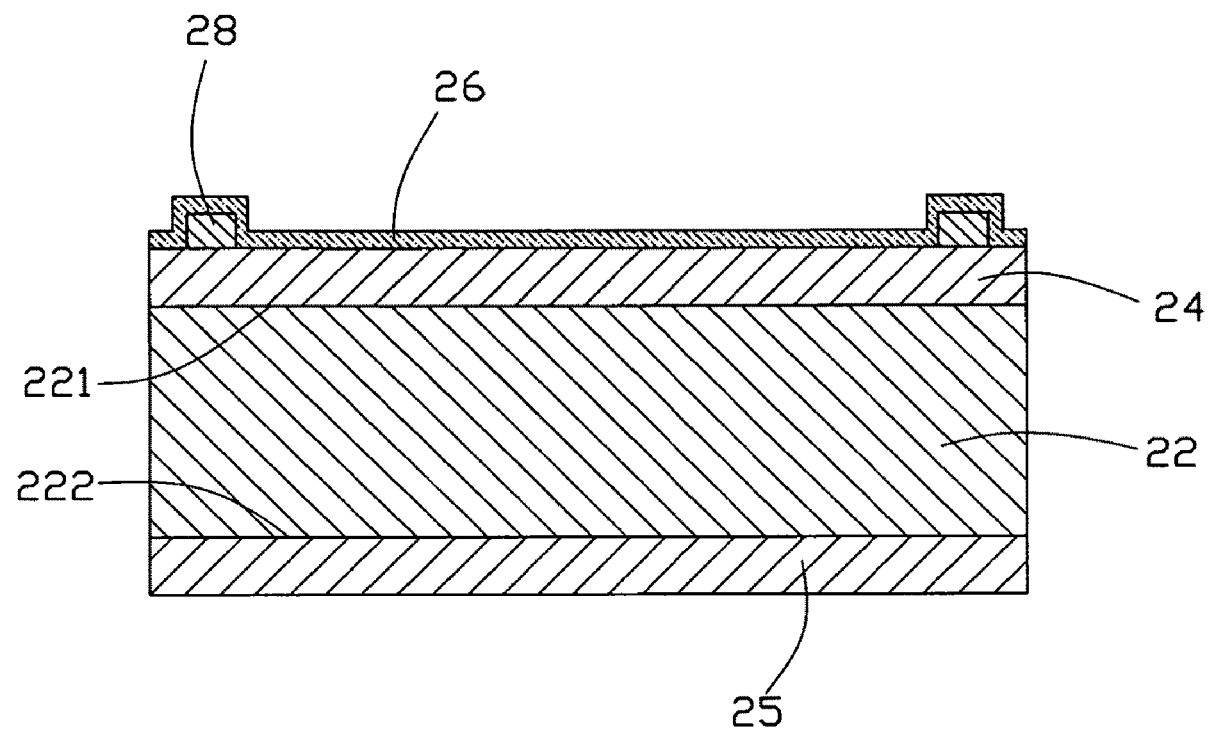
FIG. 2 is a cross-sectional schematic view of the touch panel of FIG. 1 along a line II-II.

Referring to FIG. 1 and FIG. 2, a touch panel 20 includes a substrate 22, a transparent conductive layer 24, a protective layer 26, and at least two electrodes 28. The substrate 22 has a first surface 221 and a second surface 222 opposite to the first surface 221. The transparent conductive layer 24 is disposed on the first surface 221. The electrodes 28 are separately disposed on edges or corners of the transparent conductive layer 24 and electrically connected therewith for forming an equipotential surface on the transparent conductive layer 24. The transparent protective layer 26 covers the exposed surface of the transparent conductive layer 24 and the electrodes 28, away from the substrate 22.

It is to be noted that the shape of the substrate 22 and the transparent conductive layer 24 is chosen according to the requirements of the touch field of the touch panel 22. Generally, the shape of the touch field may be triangular or rectangular. In the present embodiment, the shapes of the touch field, the substrate, and the transparent conductive layer 24 are all rectangular.

In the present embodiment four electrodes 28 are formed on the surface of the transparent conductive layer 24, thereby obtaining an equipotential surface. In the present embodiment, the four electrodes 28 are strip-shaped, and separately disposed on a surface of the transparent conductive layer 24 facing away from the substrate 22. It is to be understood that the electrodes 28 can also be separately disposed on different surfaces of the transparent conductive layer 24.

The substrate 22 has a planar structure or a curved structure. The material of the substrate 22 is selected from the group consisting of glass, quartz, diamond, and plastics. The substrate 22 is made from transparent flexible materials and hard materials. The substrate 22 is used to support the transparent conductive layer 24.

The transparent conductive layer 24 includes conductive indium tin oxide (ITO) layers, carbon nanotube layers, conductive polymer layers, or layers made of any other transparent conductive materials.

At least one of the electrodes 28 includes a carbon nanotube layer. The carbon nanotube layer is formed by a plurality of carbon nanotubes, ordered or otherwise, and has a uniform thickness. The carbon nanotube layer can further include a carbon nanotube film or a plurality of stacked carbon nanotube films. Alignment of the carbon nanotube films is arbitrary. The carbon nanotube film can be an ordered film or a disordered film. In the ordered film, the carbon nanotubes are oriented along a same direction or different desired directions. In the disordered film, the carbon nanotubes are disordered or isotropic. The disordered carbon nanotubes entangle with each other. The isotropic carbon nanotubes are parallel to a surface of the carbon nanotube film.

The width of the carbon nanotube film can be in the approximate range from 1 micron to 10 millimeters. The thickness of the carbon nanotube film can be in the approximate range from 0.5 nanometers to 50 microns. The carbon nanotubes in the carbon nanotube film includes single-walled carbon nanotubes, double-walled carbon nanotubes, or multi-walled carbon nanotubes. Diameters of the single-walled carbon nanotubes, the double-walled carbon nanotubes, and the multi-walled carbon nanotubes can, respectively, be in the approximate range from 0.5 to 50 nanometers, 1 to 50 nanometers, and 1.5 to 50 nanometers.

In the present embodiment, the four electrodes 28 are formed of a carbon nanotube layer, which includes a plurality of carbon nanotube films stacked one on the other. The alignment directions of the carbon nanotube films are set as desired. Typically, the carbon nanotubes in each carbon nanotube film are aligned substantially parallel to a same direction (i.e., the carbon nanotube film is an ordered film). More specifically, each carbon nanotube film includes a plurality of successive and oriented carbon nanotubes joined end to end by van der Waals attractive force.

Figure 3:
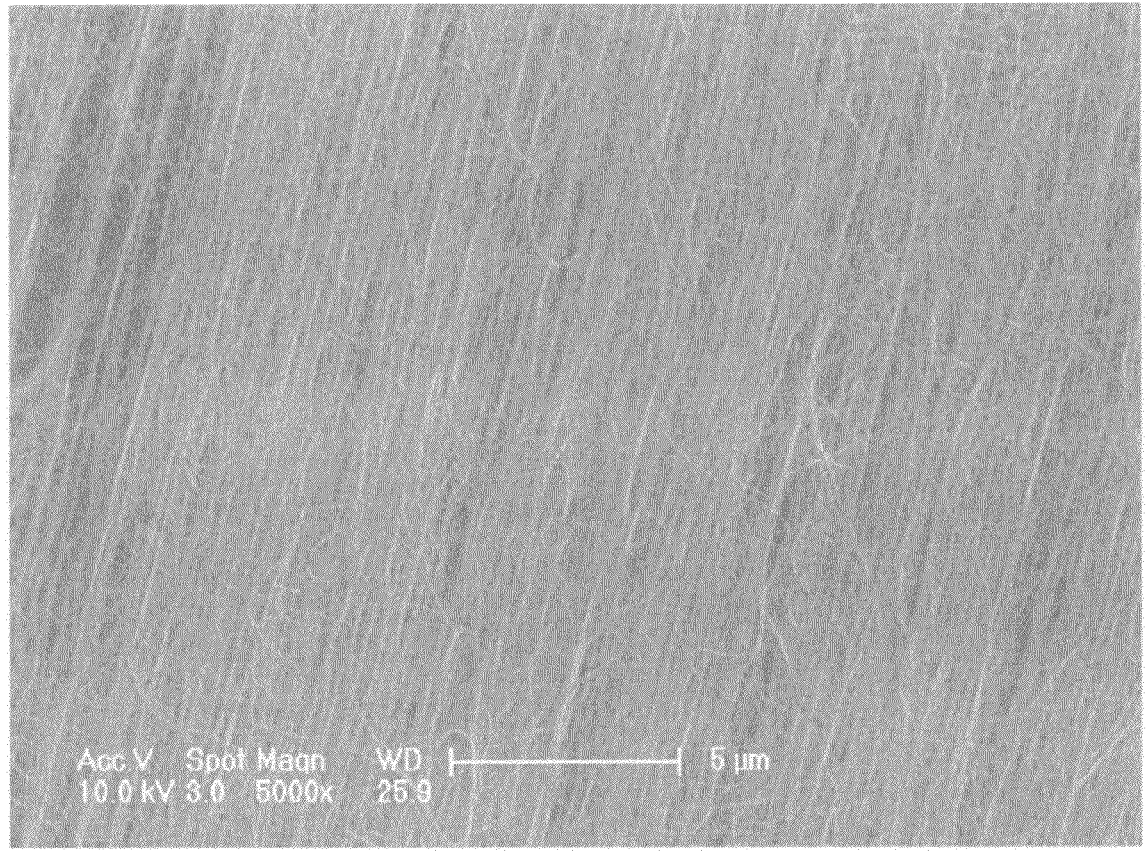
FIG. 3 shows a Scanning Electron Microscope (SEM) image of a carbon nanotube film used in the touch panel of FIG. 1.
Figure 4:
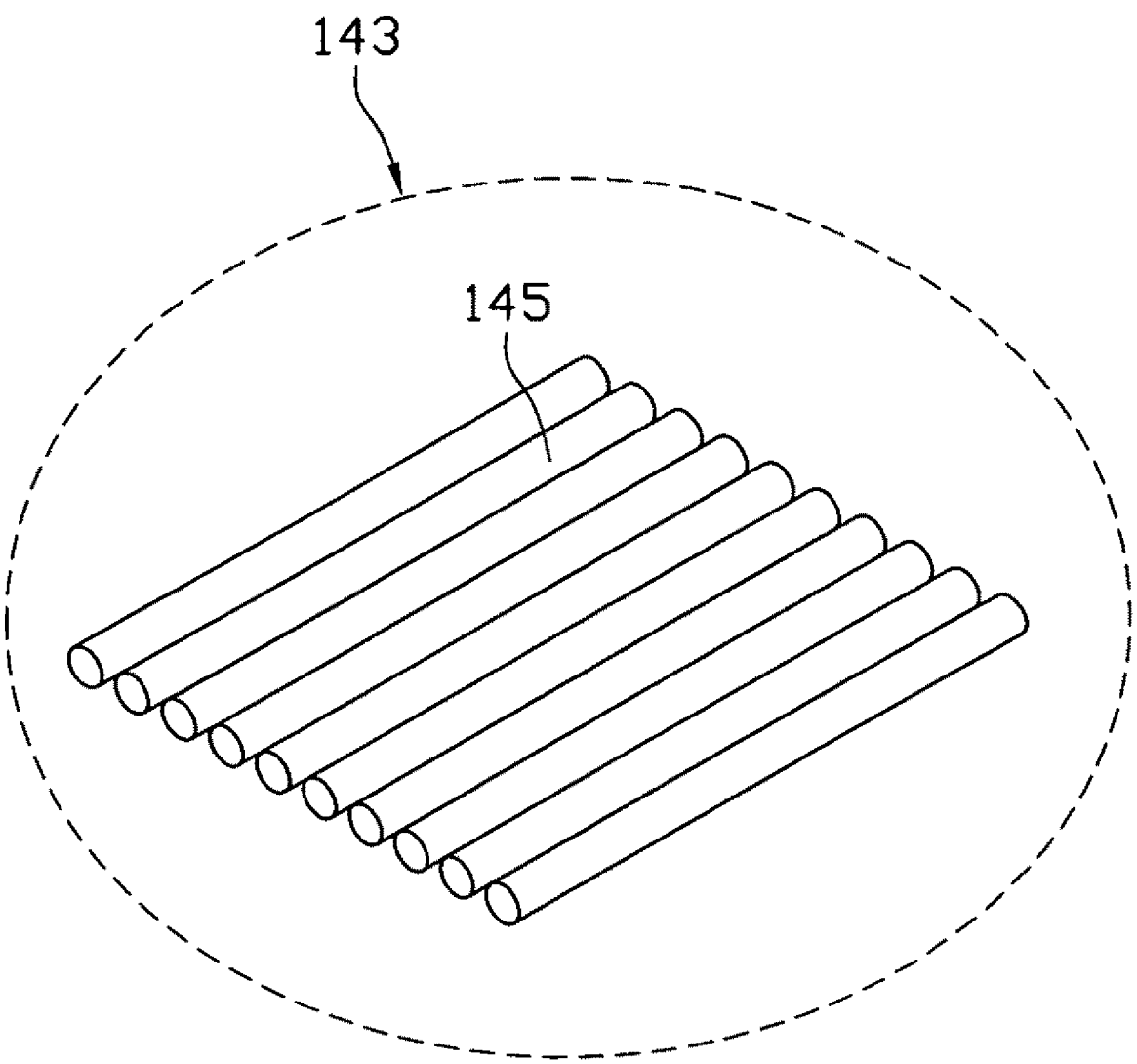
FIG. 4 is a structural schematic of a carbon nanotube segment.

Referring to FIGS. 3 and 4, each carbon nanotube film comprises a plurality of successively oriented carbon nanotube segments 143 joined end-to-end by van der Waals attractive force therebetween. Each carbon nanotube segment 143 includes a plurality of carbon nanotubes 145 parallel to each other, and combined by van der Waals attractive force therebetween. The carbon nanotube segments 143 can vary in width, thickness, uniformity and shape. The carbon nanotubes 145 in the carbon nanotube film 143 are also oriented along a preferred orientation.

A method for fabricating an above-described carbon nanotube film includes the steps of: (a) providing an array of carbon nanotubes; (b) pulling out a carbon nanotube film from the array of carbon nanotubes, by using a tool (e.g., adhesive tape, pliers, tweezers, or another tool allowing multiple carbon nanotubes to be gripped and pulled simultaneously).

In step (a), a given super-aligned array of carbon nanotubes can be formed by the substeps of: (a1) providing a substantially flat and smooth substrate; (a2) forming a catalyst layer on the substrate; (a3) annealing the substrate with the catalyst layer in air at a temperature in the approximate range from 700° C. to 900° C. for about 30 to 90 minutes; (a4) heating the substrate with the catalyst layer to a temperature in the approximate range from 500° C. to 740° C. in a furnace with a protective gas therein; and (a5) supplying a carbon source gas to the furnace for about 5 to 30 minutes and growing the super-aligned array of carbon nanotubes on the substrate.

In step (a1), the substrate can be a P-type silicon wafer, an N-type silicon wafer, or a silicon wafer with a film of silicon dioxide thereon. Preferably, a 4 inches P-type silicon wafer is used as the substrate.

In step (a2), the catalyst can be made of iron (Fe), cobalt (Co), nickel (Ni), or any alloy thereof.

In step (a4), the protective gas can be made up of at least one of nitrogen ($N_2$), ammonia ($NH_3$), and a noble gas. In step (a5), the carbon source gas can be a hydrocarbon gas, such as ethylene ($C_2H_4$), methane ($CH_4$), acetylene ($C_2H_2$), ethane ($C_2H_6$), or any combination thereof.

The super-aligned array of carbon nanotubes can have a height of about 50 microns to 5 millimeters and include a plurality of carbon nanotubes parallel to each other and approximately perpendicular to the substrate. The carbon nanotubes in the carbon nanotube film includes single-walled carbon nanotubes, double-walled carbon nanotubes, or multi-walled carbon nanotubes. Diameters of the single-walled carbon nanotubes, the double-walled carbon nanotubes, and the multi-walled carbon nanotubes can, respectively, be in the approximate range from 0.5 to 50 nanometers, 1 to 50 nanometers, and 1.5 to 50 nanometers.

The super-aligned array of carbon nanotubes formed under the above conditions is essentially free of impurities such as carbonaceous or residual catalyst particles. The carbon nanotubes in the super-aligned array are closely packed together by the van der Waals attractive force.

In step (b), the carbon nanotube film can be formed by the substeps of: (b1) selecting one or more of carbon nanotubes in a predetermined width from the super-aligned array of carbon nanotubes; and (b2) pulling the carbon nanotubes to form nanotube segments at an even/uniform speed to achieve a uniform carbon nanotube film.

In step (b1), the carbon nanotubes in a predetermined width can be selected by using an adhesive tape as the tool to contact the super-aligned array. Each carbon nanotube segment includes a plurality of carbon nanotubes parallel to each other. In step (b2), the pulling direction is substantially perpendicular to the growing direction of the super-aligned array of carbon nanotubes.

More specifically, during the pulling process, as the initial carbon nanotube segments are drawn out, other carbon nanotube segments are also drawn out end to end due to van der Waals attractive force between ends of adjacent segments. This process of drawing ensures a substantially continuous and uniform carbon nanotube film having a predetermined width can be formed. Referring to FIG. 3, the carbon nanotube film includes a plurality of carbon nanotubes joined ends to ends. The carbon nanotubes in the carbon nanotube film are all substantially parallel to the pulling/drawing direction of the carbon nanotube film, and the carbon nanotube film produced in such manner can be selectively formed to have a predetermined width. The carbon nanotube film formed by the pulling/drawing method has superior uniformity of thickness and conductivity over a typical disordered carbon nanotube film. Further, the pulling/drawing method is simple, fast, and suitable for industrial applications.

The maximum width of the carbon nanotube film depends on a size of the carbon nanotube array. The length of the carbon nanotube film can be arbitrarily set, as desired. In one embodiment, when the substrate is a 4-inch type wafer, the width of the carbon nanotube film is in an approximate range from 0.5 nanometers to 10 centimeters, and the thickness of the carbon nanotube film is in the approximate range from 0.5 nanometers to 100 micrometers. The carbon nanotubes in the carbon nanotube film can be selected from a group consisting of single-walled carbon nanotubes, double-walled carbon nanotubes, and multi-walled carbon nanotubes. Diameters of the single-walled carbon nanotubes are in an approximate range from 0.5 nanometers to 50 nanometers. Diameters of the double-walled carbon nanotube are in an approximate range from 1 nanometer to 50 nanometers. Diameters of the multi-walled carbon nanotube are in an approximate range from 1.5 nanometers to 50 nanometers.

It is noted that because the carbon nanotubes in the super-aligned carbon nanotube array have a high purity and a high specific surface area, the carbon nanotube film is adherent in nature. As such, the carbon nanotube film can be directly adhered directly to the first surface 221 of the substrate 22 or the transparent conductive layer 24.

When the electrodes 28 include a plurality of carbon nanotube films, the carbon nanotube films can be adhered to the first surface 221 of the substrate 22 or the transparent conductive layer 24 along different directions.

The carbon nanotube film, once adhered to the first surface 221 of the substrate 22 or the transparent conductive layer 24, can be treated with an organic solvent. Specifically, the carbon nanotube film can be treated by applying organic solvent to the carbon nanotube film to soak the entire surface of the carbon nanotube film. The organic solvent is volatilizable and can be selected from the group consisting of ethanol, methanol, acetone, dichloroethane, chloroform, and any appropriate mixture thereof. After being soaked by the organic solvent, microscopically, carbon nanotube strings will be formed by adjacent carbon nanotubes in the carbon nanotube film that, if able to do so, bundle together, due to the surface tension of the organic solvent. In one aspect, more of the carbon nanotubes in the untreated carbon nanotube film that were not adhered on the substrate will adhere on the first surface 221 of the substrate 22 or the transparent conductive layer 24 after the organic solvent treatment due to the surface tension of the organic solvent. Then the contacting area of the carbon nanotube film with the substrate will increase, and thus, the carbon nanotube film will better adhere to the first surface 221 of the substrate 22 or the transparent conductive layer 24. In another aspect, due to the decrease of the specific surface area via bundling, the mechanical strength and toughness of the carbon nanotube film are increased and the coefficient of friction of the carbon nanotube films is reduced. Macroscopically, the film will be an approximately uniform carbon nanotube film.

Compared with previous methods for making metallic electrodes, the present method does not require a vacuum environment and heat processing, due to the carbon nanotube film being obtained by pulling out from an array of carbon nanotubes. Thus, the carbon nanotube layer formed by the carbon nanotube film and used as the electrodes 28 has the advantage of being low cost, environmentally safe, and energy efficient.

It is to be understood that a shape of a working area of the touch panel 20 can be set as desired. And a shape of the electrodes 28 and the transparent conductive layer 24 are depended on the shape of the working area (e.g. a rectangular area, or a triangular area) of the touch panel 20.

It will be apparent to those having ordinary skills in the present invention that the transparent conductive layer 24 can include a carbon nanotube layer. The fabricating method of the transparent conductive layer 24 is similar to the above-described fabricating method of the electrodes 28. The carbon nanotube layer can include one or a plurality of carbon nanotube films. It is to be understood that the size of the touch panel 10 is not confined by the size of the carbon nanotube films. When the size of the carbon nanotube films is smaller than the desired size of the touch panel 10, a plurality of carbon nanotube films can be disposed side by side and cover the entire surface of the substrate 22.

Further, in order to prolong operational life span and restrict coupling capacitance of the touch panel 20, a transparent protective layer 26 is disposed on the electrodes 28 and the transparent conductive layer 24. The material of the transparent protective layer 26 can be selected from a group consisting of silicon nitride, silicon dioxide, benzocyclobutenes, polyester film, and polyethylene terephthalate. The transparent protective layer 26 can, rather appropriately, be a slick plastic film and receive a surface hardening treatment to protect the electrodes 28 and the transparent conductive layer 24 from being scratched when in use.

In the present embodiment, the transparent protective layer 26 is silicon dioxide. Hardness and thickness of the transparent protective layer 26 are selected according to practical needs. The transparent protective layer 26 is adhered to the transparent conductive layer 24.

The touch panel 20 can further include a shielding layer 25 disposed on the second surface 222 of the substrate 22. The material of the shielding layer can be indium tin oxide, antimony tin oxide, carbon nanotube film, and other conductive materials. In the present embodiment, the shielding layer 25 is a carbon nanotube film. The carbon nanotube film includes a plurality of carbon nanotubes, and the orientation of the carbon nanotubes therein can be arbitrarily determined. In the present embodiment, the carbon nanotubes in the carbon nanotube film of the shielding layer are arranged along a same direction. The carbon nanotube film is connected to ground and acts as shielding and, thus, enabling the touch panel 20 to operate without interference (e.g., electromagnetic interference).

Figure 5:
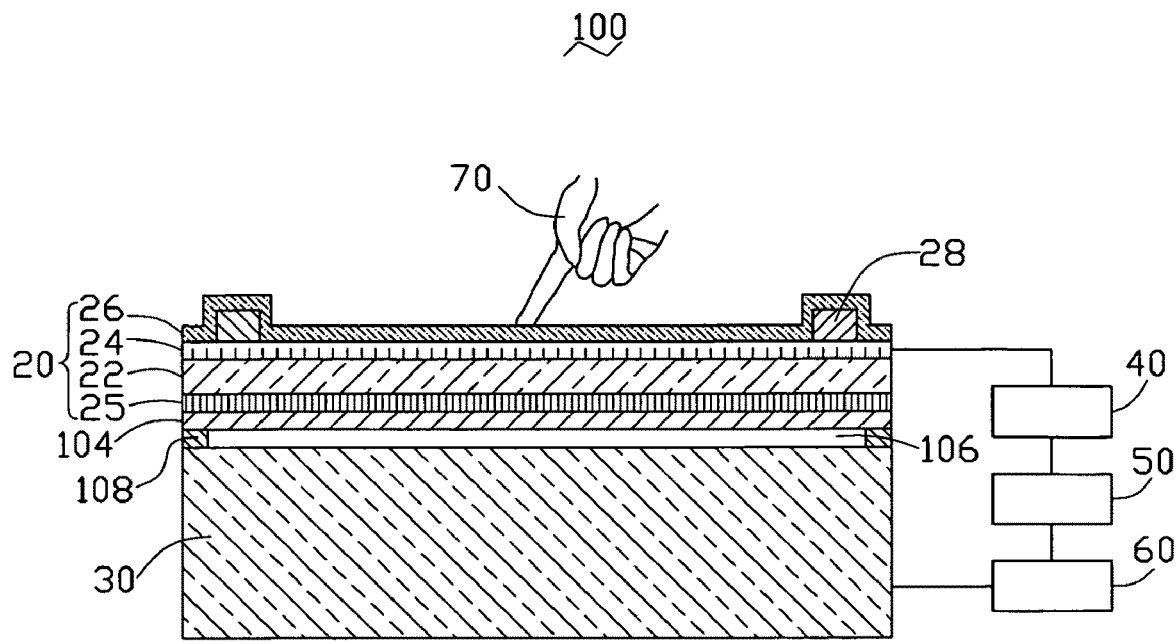
FIG. 5 is a schematic assembled view of the touch panel of a display device using the touch panel shown in FIG. 2

Referring to FIG. 5, a display device 100 includes the touch panel 20, a display element 30, a touch panel controller 40, a central processing unit (CPU) 50, and a display element controller 60. The touch panel 20 is opposite and adjacent to the display element 30. The touch panel 20 can be spaced from the display element 30 for a distance or can be installed on the display element 30. The touch panel 20 is connected to the touch panel controller 40 by an external circuit. The touch panel controller 40, the CPU 50 and the display element controller 60 are electrically connected. The CPU 50 is connected to the display element controller 60 to control the display element 30.

The display element 30 can be a liquid crystal display, field emission display, plasma display, electroluminescent display, vacuum fluorescent display, cathode ray tube, or another display device.

When a shielding layer 25 is disposed on the second surface 222 of the substrate 22, a passivation layer 104 is disposed on a surface of the shielding layer 25, facing away from the substrate 22. The material of the passivation layer 104 can, for example, be silicon nitride or silicon dioxide. The passivation layer 104 can be spaced from the display element 30 for a certain distance 106 by spacers 108 or can be installed on the display element 30. The passivation layer 104 protect the shielding layer 25 from chemical damage (e.g., humidity of the surrounding) or mechanical damage (e.g., scratching during fabrication of the touch panel).

In operation, a voltage is applied to the electrodes 28 respectively. A user operates the display device 100 by pressing or touching the protective layer 26 of the touch panel 20 with a touch tool, such as a finger, and an electrical pen 70, while visually observing the display element 20 through the touch panel. Due to an electrical field of the user, a coupling capacitance forms between the user and the transparent conductive layer 24. When a touch tool 70 touches the surface of the touch panel 20, the touch tools 70 take away little currents from the touch points. Current flowing through the four electrodes cooperatively replace the current lost at the touch point. The quantity of current supplied by each electrode is directly proportional to the distances from the touch point to the electrodes 28. The touch panel controller 40 is used to calculate the proportion of the four supplied currents, thereby detecting coordinates of the touch point on the touch panel 20. And then, the touch panel controller 40 sends the coordinates of the touch point to CPU 50. The CPU 50 receives the coordinates, and processes the coordinates into a command. Finally, the CPU 50 then sends out the command to the display element controller 60. The display element controller 60 controls the display of the display element 30.

The carbon nanotube layer provided in the embodiments, has superior properties, such as excellent toughness and high mechanical strength. Thus, the touch panel 20 and the display device 100 using the same are durable and highly reliable. Further, the pulling method for fabricating the carbon nanotube layer is simple, and the adhesive carbon nanotube layer can be disposed directly on the substrate. As such, the method for fabricating the carbon nanotube layer is suitable for the mass production of touch panels and display devices using the same and reduces the cost thereof. Additionally, the carbon nanotube layer has uniform conductivity and can significantly decrease a contact resistance between the electrodes and the conductive layers especially for the touch panel adopting the carbon nanotube layers as the conductive layers.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A touch panel comprising:
   a substrate;
   a transparent conductive layer disposed on the substrate; and
   at least two electrodes electrically connected with the transparent conductive layer,
   wherein at least one electrode comprises a first carbon nanotube layer, the first carbon nanotube layer comprises a plurality of carbon nanotube films directly stacked on each other, each of the plurality of carbon nanotube films comprises a plurality of carbon nanotubes arranged along a primary direction, and the transparent conductive layer comprises unfunctionalized carbon nanotubes.

2. The touch panel as claimed in claim 1, wherein the plurality of carbon nanotubes in each of the plurality of carbon nanotube films are parallel to a surface thereof.

3. The touch panel as claimed in claim 1, wherein a thickness of each of the plurality of carbon nanotube films is in the approximate range from 0.5 nanometers to 100 microns, and a width thereof is in the approximate range from 1 micron to 10 millimeters.

4. The touch panel as claimed in claim 1, wherein the plurality of carbon nanotubes are selected from the group consisting of single-walled carbon nanotubes, double-walled carbon nanotubes, multi-walled carbon nanotubes, and any combination thereof.

5. The touch panel as claimed in claim 4, wherein diameters of the single-walled carbon nanotubes, the double-walled carbon nanotubes, and the multi-walled carbon nanotubes are respectively in the approximate range from 0.5 to 50 nanometers, 1 to 50 nanometers, and 1.5 to 50 nanometers.

6. The touch panel as claimed in claim 1, wherein the at least two electrodes are separately disposed on a surface of the transparent conductive layer.

7. The touch panel as claimed in claim 1, further comprising a transparent protective layer disposed on the transparent conductive layer, and the material of the transparent protective layer being selected from the group consisting of silicon nitride, silicon dioxide, benzocyclobutenes, polyester film, and polyethylene terephthalate.

8. The touch panel as claimed in claim 1, wherein the material of the substrate is selected from the group consisting of glass, quartz, diamond, transparent flexible material, and any combination thereof.

9. The touch panel as claimed in claim 1, further comprising a shielding layer disposed on the substrate, and the material of the shielding layer being selected from the group consisting of indium tin oxides, antimony tin oxides, and carbon nanotube films.

10. The touch panel as claimed in claim 1, wherein the transparent conductive layer comprises a second carbon nanotube layer.

11. A display device comprising:
  a touch panel comprising
    a substrate,
    a transparent conductive layer disposed on the substrate, and
    at least two electrodes electrically connected with the transparent conductive layer, at least one electrodes comprising a first carbon nanotube layer; and
  a display element adjacent to the touch panel,
  wherein the first carbon nanotube layer comprises a plurality of carbon nanotube films directly stacked on each other, each of the plurality of carbon nanotube films comprises a plurality of carbon nanotubes arranged along a primary direction, and the transparent conductive layer comprises a second carbon nanotube layer comprising unfunctionalized carbon nanotubes.

12. The display device as claimed in claim 11, further comprising a first controller configured for controlling the touch panel, a central processing unit, and a second controller configured for controlling the display element; the first controller, the central processing unit, and the second controller being electrically connected with each other; the display element being connected to the second controller, and the touch panel being connected to the first controller.

13. The display device as claimed in claim 11, wherein the touch panel is spaced from the display element for a distance or installed on the display element.

14. The display device as claimed in claim 11, further comprising a passivation layer disposed on a surface of the touch panel.

15. The touch panel as claimed in claim 10, wherein the second carbon nanotube layer comprises a plurality of ordered and successive carbon nanotube segments, the plurality of ordered and successive carbon nanotube segments are joined end to end by the van der Waals attractive force and comprise a plurality of carbon nanotubes primarily oriented along a same direction.

16. The touch panel as claimed in claim 15, wherein the transparent conductive layer consists of the second carbon nanotube layer, and the second carbon nanotube layer consists of the plurality of carbon nanotubes.

17. A touch panel comprising:
  a substrate;
  a transparent conductive layer disposed on the substrate; and
  at least two electrodes electrically connected with the transparent conductive layer,
  wherein at least one electrode comprises a first carbon nanotube layer, the transparent conductive layer comprises a second carbon nanotube layer, and the transparent conductive layer comprises a plurality of unfunctionalized carbon nanotubes.

18. The touch panel as claimed in claim 17, wherein the second conductive layer consists of the carbon nanotube layer, and the carbon nanotube layer consists of the plurality of carbon nanotubes primarily oriented along a same direction.

* * * * *